United States Patent
Warren

[11] Patent Number: 5,775,207
[45] Date of Patent: Jul. 7, 1998

[54] SAFETY FORK FOR USE OVER CAMP FIRES AND GRILLS

[76] Inventor: John F. Warren, 618 Country Lake Dr., St. Peters, Mo. 63376-6902

[21] Appl. No.: 919,901

[22] Filed: Aug. 28, 1997

[51] Int. Cl.⁶ .......................... A47J 37/00; A47J 37/04; A47J 43/18; A47J 43/28
[52] U.S. Cl. ................ 99/394; 99/419; 99/421 A; 99/426; 99/441; D7/686
[58] Field of Search ................ 99/339, 340, 394, 99/419–421 V, 426, 449, 441, 440, 442; 30/322, 332, 129; 294/100, 99.1, 50, 61, 49, 1.1; D7/686, 357, 328, 683

[56] References Cited

U.S. PATENT DOCUMENTS

| | | | |
|---|---|---|---|
| D. 3,840 | 2/1870 | Fawcett et al. | D7/686 |
| D. 95,309 | 4/1935 | Bennett | D7/686 |
| 99,971 | 2/1870 | Taylor et al. | |
| D. 156,731 | 1/1950 | Hobbs. | |
| 1,748,741 | 2/1930 | Tanaki. | |
| 1,754,968 | 4/1930 | Smith. | |
| 2,191,226 | 2/1940 | Clem | 99/419 |
| 2,317,388 | 4/1943 | Lako, Jr. | 99/419 |
| 2,479,324 | 8/1949 | Dawson | 99/419 |
| 2,479,533 | 8/1949 | Woodbury | 99/419 |
| 2,487,651 | 11/1949 | Gudmundsen | 99/394 |
| 2,514,281 | 7/1950 | Hobbs. | |
| 2,649,042 | 8/1953 | Wickman | 99/441 |
| 2,706,446 | 4/1955 | Lockey | 99/419 |
| 2,838,990 | 6/1958 | Stiburski | 99/419 |
| 2,946,276 | 7/1960 | Stone | 99/419 |
| 3,745,910 | 7/1973 | Delamater | 99/419 |
| 3,906,632 | 9/1975 | Oppenheimer | 30/322 |
| 4,090,438 | 5/1978 | Luna | 99/441 |
| 4,176,592 | 12/1979 | Doyle, Jr. | 99/419 |
| 4,258,617 | 3/1981 | Akwei | 99/419 |
| 4,380,192 | 4/1983 | Doren | 99/441 |
| 4,436,024 | 3/1984 | Arden et al. | 99/421 HV |
| 4,517,885 | 5/1985 | Thompson | 99/441 X |
| 4,612,851 | 9/1986 | McManus | 99/421 A |
| 4,982,657 | 1/1991 | Ghenic | 99/419 X |
| 5,238,445 | 8/1993 | Green | 99/419 |
| 5,310,381 | 5/1994 | Green | 99/419 |
| 5,370,433 | 12/1994 | Yost | 294/61 X |
| 5,628,244 | 5/1997 | Holliday | 99/441 |

*Primary Examiner*—Timothy F. Simone
*Attorney, Agent, or Firm*—Grace J. Fishel

[57] ABSTRACT

A safety fork for roasting hot dogs and marshmallows over an open fire. The fork has an elongated shaft with a handle at one end and a hook at the other. The hook is formed from a pair of tines extending forwardly, then bending rearwardly forming a bight defining a food holding area adapted for receipt of one or more hot dogs or marshmallows and finally extending rearwardly, said tines having a plane of symmetry passing through the shaft. Forwardly and rearwardly extending portions of tines are in stacked planes so that the food holding area continues for a distance along the forwardly extending portion of the tines.

10 Claims, 2 Drawing Sheets

5,775,207

SAFETY FORK FOR USE OVER CAMP FIRES AND GRILLS

BACKGROUND OF THE INVENTION

1. Field of the Invention

The present invention relates to a safety fork for roasting hot dogs and marshmallows over an open fire.

2. Brief Description of the Prior Art

One of life's small pleasures is roasting hot dogs and marshmallows over a camp fire or grilling them over charcoal or some other heat source. There are several problems, however, commonly encountered in this pursuit: Most forks and spits are sharp, raising the possibility for injury, particularly if there are children around and, where there are marshmallows roasting, there frequently are children. Second, the food on many spits is threaded lengthwise, causing the meat to loose its juices. Marshmallows, on the other hand, frequently fall into the fire or come apart and dangle from the spit. Another problem with forks and spits presently available is that they are not designed to cook other foods such as fresh garden vegetables, scallops, mussels, shrimp, small pieces of chicken or fish without the nuisance of skewers or food falling through the grate. While the present safety fork is designed primarily with a view towards cooking hot dogs and marshmallows, it can be used for cooking other foods too.

BRIEF SUMMARY OF THE INVENTION

In view of the above, it is an object of the present invention to provide a fork that makes roasting hot dogs and marshmallows a little more relaxing for adults by reducing the chance that someone will be injured. Another object is to provide a safety fork that firmly grips the food so that it does not drop into the fire but which does not puncture the hot dogs, causing them to loose juices. A further object is to provide a safety fork that can be used to cook a number of foods in addition to hot dogs and marshmallows. Other objects and features of the invention will be in part apparent and in part pointed out hereinafter.

In accordance with the invention, a safety fork for roasting hot dogs and marshmallows over an open fire has an elongated shaft with first and second ends, with a handle at the first end and a hook at the second end. The hook is formed from a pair of spaced apart tines, with the tines extending forwardly, then bending rearwardly forming a bight defining a food holding area adapted for receipt of one or more hot dogs or marshmallows and finally extending rearwardly. In a preferred embodiment the rearwardly extending portions of the tines are joined with a loop and are angled away from the shaft to provide a lead-in for food.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
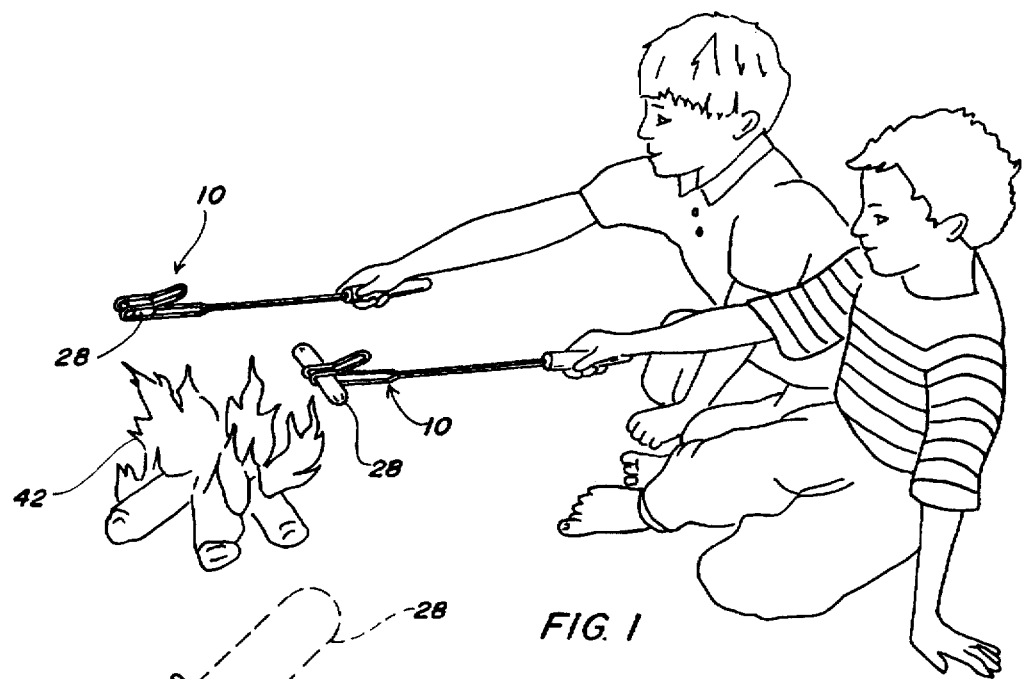
FIG. 1 is a perspective view of two boys roasting hot dogs and marshmallows with a safety fork in accordance with the present invention.

Referring to the drawings more particularly by reference character, reference numeral 10 refers to a safety fork for roasting marshmallows and hot dogs over an open fire in accordance with the present invention. In major part, safety fork 10 has a shaft 12, a handle 14 and a hook 16.

Figure 3:
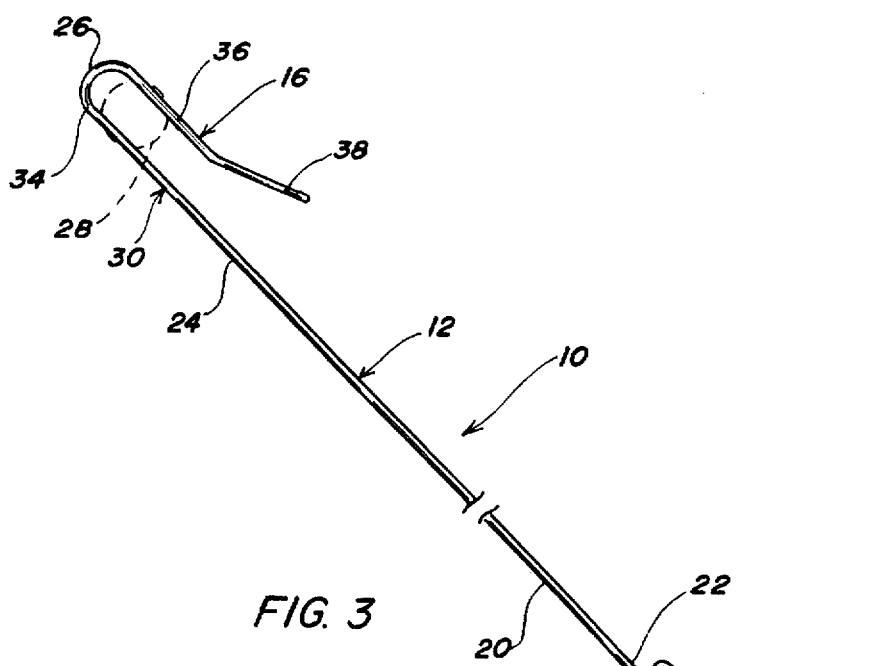
FIG. 3 is side elevation of the safety fork with the hot dog shown in broken lines.
Figure 4:
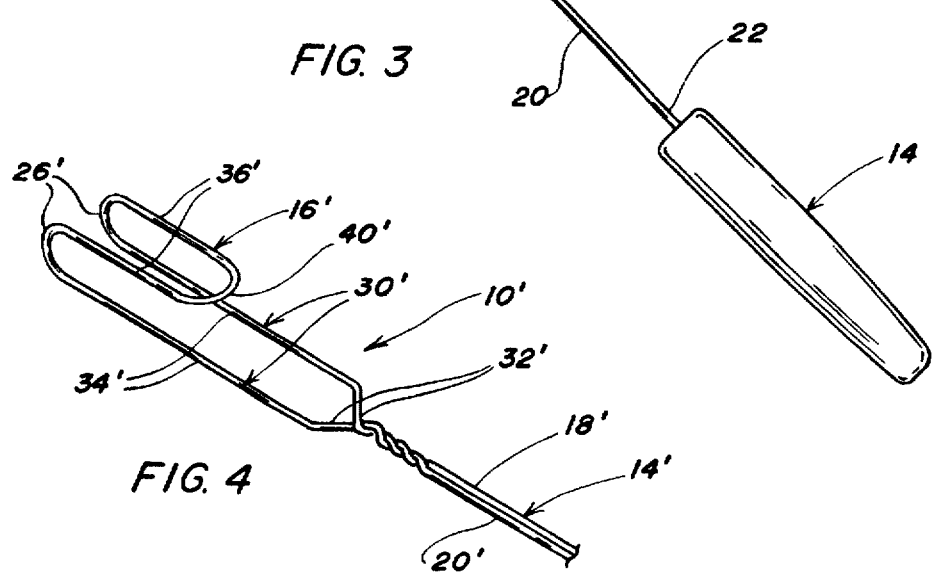
FIG. 4 is a partial, perspective view of a second safety fork in accordance with the present invention, with the handle and portions of the shaft deleted; and, FIG. 5 is a partial, perspective view of a third safety fork in accordance with the present invention, with the handle and portions of the shaft deleted.
Figure 5:
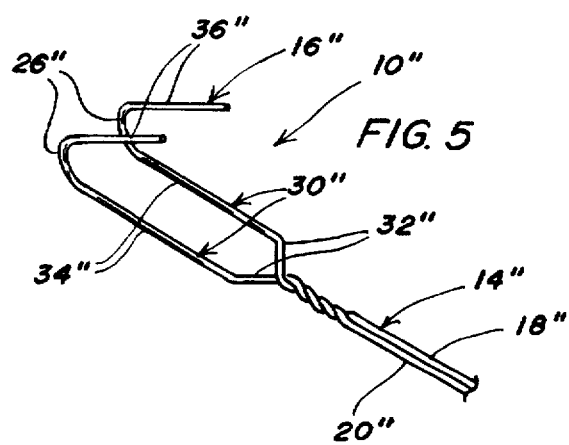

Shaft 12 consists of a pair of contiguous metal strands 18, 20 which may be parallel (FIGS. 1-3), twisted together along their entire length or some combination thereof (FIGS. 4-5). The strands mutually support each other and provide a firm shank that keeps its shape even when hot dogs and marshmallows are loaded on the fork as more particularly described below.

Shaft 12 has first and second ends 22, 24, respectively. First end 22 is attached to handle 14 which may be integrally formed as a loop in strands 18, 20. Preferably, however, handle 14 is generally cylindrical in shape with a central bore into which strands 18, 20 are received, handle 14 being preferably formed of plastic, wood or some other thermally insulative material to limit the conduction of heat from shaft 12. At second end 24 of shaft, strands 18, 20 continue to form hook 16 with a bight 26 defining a food holding area for receipt of one or more pieces of food 28, such as hot dogs, marshmallows and the like.

Figure 2:
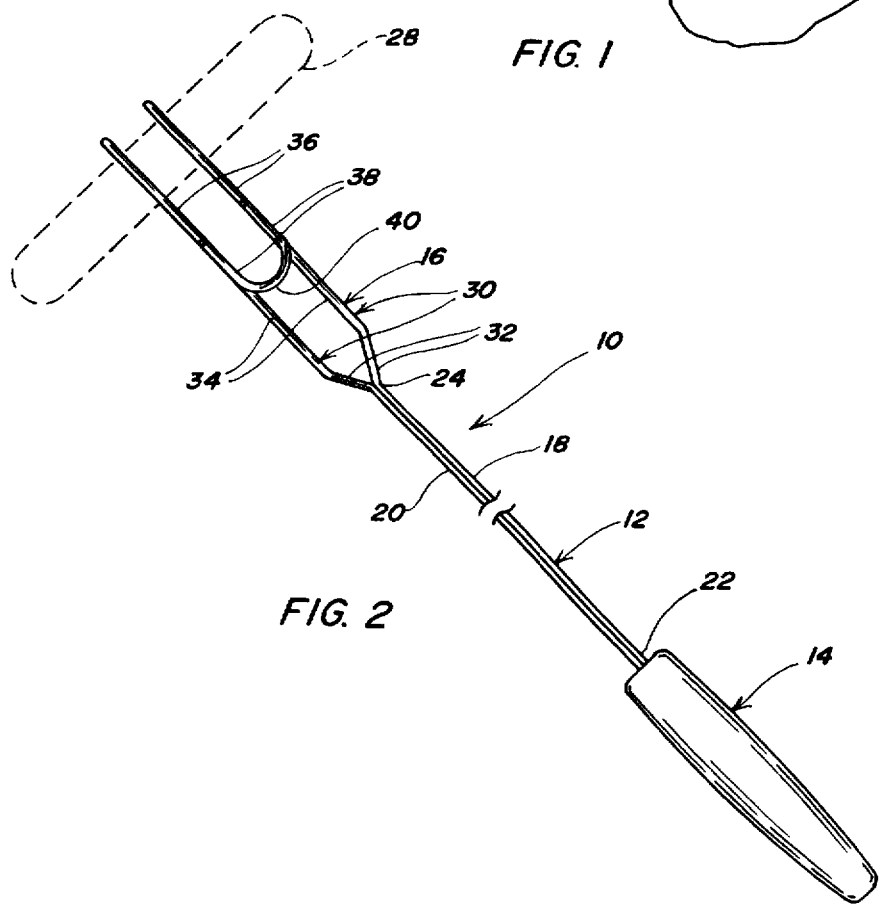
FIG. 2 is a plan view of the safety fork with a hot dog shown in broken lines.

Hook 16 comprises a pair of spaced apart tines 30 with a plane of symmetry passing through shaft 12. Hook is formed by bending strands 18, 20 outwardly from the center line of shaft 12 at 32 and then generally parallel to, but out of alignment with the center line of shaft 12, to form a first pair of legs 34, preferably spaced about ½ inch apart. From legs 34 strands 18, 20 are bent back upon themselves, forming bight 26, preferably about ½ inch wide, and then a second pair of congruent legs 36. Legs 36 and 34 are preferably in vertically stacked planes so that the food holding area continues for some distance along legs 34. In a preferred embodiment as shown in FIGS. 1-3, distal ends of legs 36 are preferably offset (i.e., angled away from the center line of shaft 12) to provide a lead-in 38 for the food and are interconnected with a loop 40 of wire. In this form, strands 18, 20 may be formed from a single piece of wire, bent as described above. In other embodiments, however, legs 36 may not be offset (FIGS. 4-5) or may not be interconnected with loop 40 (FIG. 5).

From the foregoing description of shaft 12, handle 14 and hook 16, it will be readily appreciated that safety fork 10 can be easily made at a minimum cost and with a minimum of parts.

In use as shown in FIG. 1, safety fork 10 is particularly adapted for use in roasting hot dogs and marshmallows over an open fire such as a camp fire 42, an activity commonly engaged in by campers and scouts, as well as families and friends gathered for an outdoor event. With young children, adults frequently take over threading the food on the cooking utensils presently available to avoid possible injury. Even then, adult supervision does not end, as there is a possibility that a child may inadvertently or intentionally injure someone else with the fork or spit if left unwatched.

While adult supervision is always a good idea, safety fork 10 can be used by children with relatively little chance of injury, particularly with the embodiments shown in FIGS. 1-4 where legs 36 are joined with loop 40. A hot dog, or several hot dogs, or a marshmallow can be easily inserted into bight 26 where it is held as the food is being cooked to the desired degree of doneness (e.g., blackness). Since the hot dogs have not been punctured, they do not loose juices and the marshmallows do not fall off into the fire. Other food items such as fresh garden vegetables, scallops, mussels, shrimp, small pieces of chicken or fish may also be cooked, without the nuisance of threading them on skewers or food falling through the grate.

Roasting hot dogs and marshmallows over an open fire is one of life's small pleasures because it is relaxing, best enjoyed at a slow pace and unmarred by injury. In an age of fast food and families eating meals on different schedules, the time spent together roasting hot dogs and marshmallows is very precious. Safety fork 10 helps to make the experience a little more relaxing for the adults by reducing the chance that someone will be injured and the pleasure spoiled.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A safety fork for roasting hot dogs and marshmallows over an open fire, said fork comprising an elongated shaft with first and second ends, a handle at the first end and a hook at the second end, said hook formed from a pair of spaced apart tines, said tines extending forwardly, then bending rearwardly forming a bight defining a food holding area adapted for receipt of one or more hot dogs or marshmallows and finally extending rearwardly, said rearwardly extending tines having a distal end joined by a loop.

2. The safety fork of claim 1 wherein the forwardly and rearwardly extending portions of the tines are stacked so that the food holding area continues for a distance along the forwardly directed portion of the tines.

3. The safety fork of claim 2 wherein the rearwardly directed tines adjacent the loop are offset to provide a lead-in for food.

4. A safety fork for roasting hot dogs and marshmallows over an open fire, said fork comprising an elongated shaft with first and second ends, a handle at the first end and a hook at the second end, said shaft formed from a pair of contiguous strands, said hook formed by bending strands outwardly from the center line of the shaft and then generally parallel to, but out of alignment with, the center line of the shaft to form a first pair of generally parallel legs, then bending rearwardly forming a bight defining a food holding area adapted for receipt of one or more hot dogs or marshmallows and finally extending rearwardly forming a second pair of legs, said second pair of legs being congruent and stacked over the first pair of legs so that the food holding area continues for a distance along the first pair of legs.

5. The safety fork of claim 4 wherein a distal end of the second pair of legs is joined with a loop, said first and second strands and the loop being formed from a single piece of wire.

6. The safety fork of claim 5 wherein the second pair of legs adjacent the loop are angled away from the center line of the shaft to provide a lead-in for food.

7. The safety fork of claim 6 wherein the first and second pairs of legs are spaced about ½ inch apart and wherein the bight is about ½ inch wide.

8. A safety fork for roasting hot dogs and marshmallows over an open fire, said fork comprising an elongated shaft with first and second ends, a handle at the first end and a hook at the second end, said shaft formed from a pair of contiguous strands, said hook formed by bending strands outwardly from the center line of the shaft and then generally parallel to, but out of alignment with, the center line of the shaft to form a first pair of generally parallel legs, then bending rearwardly forming a bight defining a food holding area adapted for receipt of one or more hot dogs or marshmallows and finally extending rearwardly forming a second pair of legs, said second pair of legs joined with a loop at their distal end and being congruent, said second pair of legs angled away from the center line of the shaft adjacent the loop to provide a lead-in for food and stacked over the first pair of legs so that the food holding area continues for a distance along the first pair of legs.

9. The safety fork of claim 8 wherein said first and second strands and the loop being formed from a single piece of wire.

10. The safety fork of claim 9 wherein the first and second pairs of legs are spaced about ½ inch apart and wherein the bight is about ½ inch wide.

* * * * *